(12) United States Patent
Kumar et al.

(10) Patent No.: US 11,577,581 B2
(45) Date of Patent: Feb. 14, 2023

(54) APPARATUS AND SYSTEM FOR CONTROLLING POWER TO AN AIR CONDITIONING COMPRESSOR FOR A VEHICLE

(71) Applicant: Cummins Inc., Columbus, IN (US)

(72) Inventors: Mahesh Madurai Kumar, Columbus, IN (US); Gary L. Parker, Columbus, IN (US); Subbarao Varigonda, Columbus, IN (US); Joseph E. Paquette, Columbus, IN (US); Benjamin David Padgett, Columbus, IN (US); William Brent Fields, Seymour, IN (US); Praveen Chitradurga Muralidhar, Ann Arbor, MI (US); Vivek Anand Sujan, Columbus, IN (US); Dean Deter, Knoxville, TN (US); David E. Smith, Knoxville, TN (US)

(73) Assignee: Cummins Inc., Columbus, IN (US)

( * ) Notice: Subject to any disclaimer, the term of this patent is extended or adjusted under 35 U.S.C. 154(b) by 565 days.

(21) Appl. No.: 15/633,192

(22) Filed: Jun. 26, 2017

(65) Prior Publication Data

US 2017/0368913 A1    Dec. 28, 2017

Related U.S. Application Data

(60) Provisional application No. 62/354,364, filed on Jun. 24, 2016.

(51) Int. Cl.
*B60H 1/32*    (2006.01)
*B60H 1/00*    (2006.01)

(52) U.S. Cl.
CPC ....... *B60H 1/3208* (2013.01); *B60H 1/00378* (2013.01); *B60H 1/00428* (2013.01);
(Continued)

(58) Field of Classification Search
CPC .............. B60H 1/3222; B60H 1/00385; B60H 1/3208; B60H 1/00378; B60H 2001/3294
See application file for complete search history.

(56) References Cited

U.S. PATENT DOCUMENTS 3,049,928 A * 8/1962 Boughner ............... F16H 37/00
74/13
6,453,678 B1    9/2002 Sundhar
(Continued)

FOREIGN PATENT DOCUMENTS

EP         1965481         12/2010
WO       2010035275         4/2010

*Primary Examiner* — Kun Kai Ma
(74) *Attorney, Agent, or Firm* — Taft, Stettinius & Hollister LLP (57) ABSTRACT

A climate control system for vehicles includes an internal combustion engine that may be coupled to selectively power a first motor generator, and an air conditioning compressor that may be selectively powered by one or both of the first motor generator and a second motor generator, or by the internal combustion engine. The system may include a rechargeable battery, and a vehicle controller having a vehicle state circuit structured to determine a vehicle operating condition value and a state-of-charge value of the rechargeable battery, and a coupling determination circuit structured to provide an internal combustion engine-first motor generator coupling command in response to the vehicle operating condition value and the state-of-charge value. In response to the internal combustion engine-first motor generator coupling command being provided as coupled, the internal combustion engine may power the first motor generator.

17 Claims, 3 Drawing Sheets

(52) U.S. Cl.
CPC ... *B60H 1/3222* (2013.01); *B60H 2001/3294* (2013.01); *Y02T 10/88* (2013.01)

(56) References Cited

U.S. PATENT DOCUMENTS

| | | | |
|---|---|---|---|
| 6,543,243 B2 | 4/2003 | Mohrmann et al. | |
| 6,715,995 B2 * | 4/2004 | Kelm | B60H 1/3222 |
| | | | 417/12 |
| 6,742,360 B2 | 6/2004 | Suzuki et al. | |
| 6,755,030 B2 | 6/2004 | Adaniya et al. | |
| 6,755,033 B2 | 6/2004 | Iwanami et al. | |
| 6,801,842 B2 | 10/2004 | Egami et al. | |
| 6,812,582 B2 | 11/2004 | Kennedy | |
| 6,830,438 B2 | 12/2004 | Iwanami et al. | |
| 7,104,765 B2 | 9/2006 | Miyaji et al. | |
| 7,127,903 B2 | 10/2006 | Kuribayashi | |
| 7,150,159 B1 | 12/2006 | Brummett et al. | |
| 7,797,958 B2 | 9/2010 | Alston et al. | |
| 8,030,880 B2 | 10/2011 | Alston et al. | |
| 8,256,399 B2 | 9/2012 | Gamache et al. | |
| 8,453,722 B2 | 6/2013 | Zeigler et al. | |
| 8,494,712 B2 * | 7/2013 | Vasilescu | B60K 6/48 |
| | | | 180/65.27 |
| 8,565,969 B2 | 10/2013 | Bradley et al. | |
| 8,863,540 B2 | 10/2014 | Alston et al. | |
| 8,939,240 B2 | 1/2015 | Wehrwein et al. | |
| 9,024,469 B2 | 5/2015 | Nakajima | |
| 9,956,850 B2 * | 5/2018 | Casasanta | B60H 1/00378 |
| 2001/0005991 A1 * | 7/2001 | Niimi | B60H 1/3208 |
| | | | 62/133 |
| 2001/0039230 A1 * | 11/2001 | Severinsky | B60W 20/30 |
| | | | 180/65.23 |
| 2002/0194858 A1 * | 12/2002 | Mohrmann | F04B 27/0895 |
| | | | 62/236 |
| 2003/0041603 A1 * | 3/2003 | Tada | F25B 49/022 |
| | | | 62/134 |
| 2003/0200759 A1 * | 10/2003 | Iwanami | F02N 11/003 |
| | | | 62/133 |
| 2004/0079098 A1 * | 4/2004 | Uno | F04C 29/0085 |
| | | | 62/236 |
| 2006/0047398 A1 * | 3/2006 | Abe | B60W 10/08 |
| | | | 701/69 |
| 2006/0091730 A1 * | 5/2006 | Chiao | B60K 6/46 |
| | | | 307/10.1 |
| 2010/0181125 A1 * | 7/2010 | Wang | B60L 58/20 |
| | | | 180/65.21 |
| 2011/0016894 A1 | 1/2011 | Lemon et al. | |
| 2013/0047648 A1 * | 2/2013 | Zeigler | B60H 1/00428 |
| | | | 62/133 |
| 2014/0116642 A1 | 5/2014 | Courtney | |
| 2014/0297083 A1 * | 10/2014 | Okamoto | B60W 20/10 |
| | | | 903/903 |
| 2016/0169184 A1 * | 6/2016 | Winkler | B60H 1/0045 |
| | | | 290/31 |

\* cited by examiner

APPARATUS AND SYSTEM FOR CONTROLLING POWER TO AN AIR CONDITIONING COMPRESSOR FOR A VEHICLE

CROSS-REFERENCE TO RELATED APPLICATION

The present application claims the benefit of the filing date of U.S. Provisional Application Ser. No. 62/354,364 filed on Jun. 24, 2016, which is incorporated herein by reference in its entirety.

GOVERNMENT LICENSE RIGHTS

This invention was made under a CRADA NFE-13-04402 between Cummins Inc. and UT-Battelle, LLC operated for the United States Department of Energy (DOE). This invention was made with government support under contract number DE-AC05-00OR22725 awarded by the DOE. The government has certain rights in the invention.

BACKGROUND

Previously known heating, ventilation and air conditioning (HVAC) systems for vehicles having an internal combustion engine include auxiliary power units (APUs) for periods where a vehicle may not be moving but where the cab or other environment on the vehicle still needs to be maintained at a controlled temperature. Conventionally known APUs require additional integration efforts and/or a secondary air conditioning (A/C) system. Alternatively, conventionally known systems require overnight idling of the engine.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

DESCRIPTION OF ILLUSTRATIVE EMBODIMENTS

Following are more detailed descriptions of various concepts related to, and implementations of, a system for efficiently operating a vehicle's air conditioning system. The various concepts may be implemented in any of numerous ways, as the described concepts are not limited to any particular manner of implementation. Examples of specific implementations and applications are provided primarily for illustrative purposes.

Figure 1:
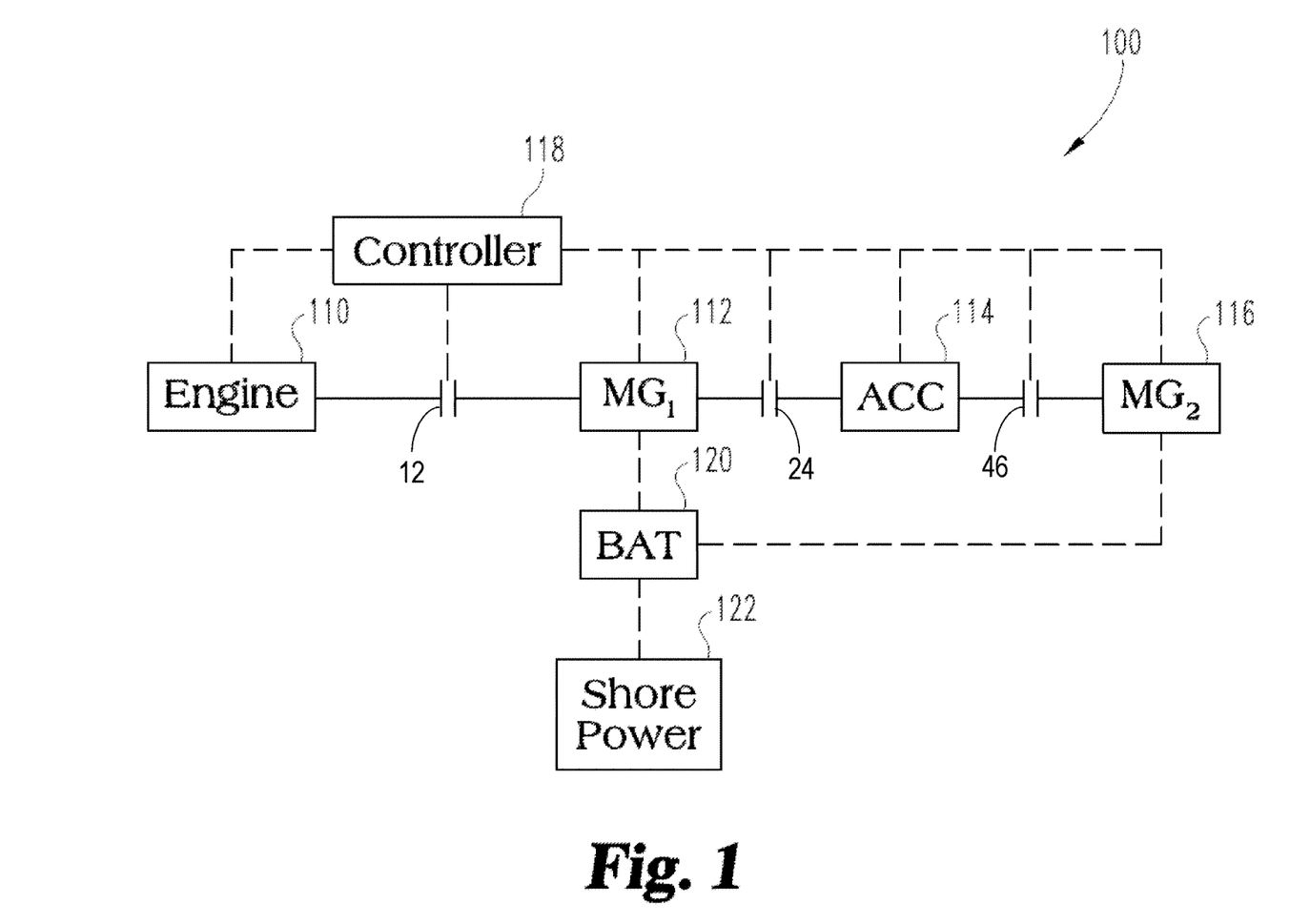
FIG. 1 is a schematic diagram of an example system having a hybrid APU.
Figure 2:
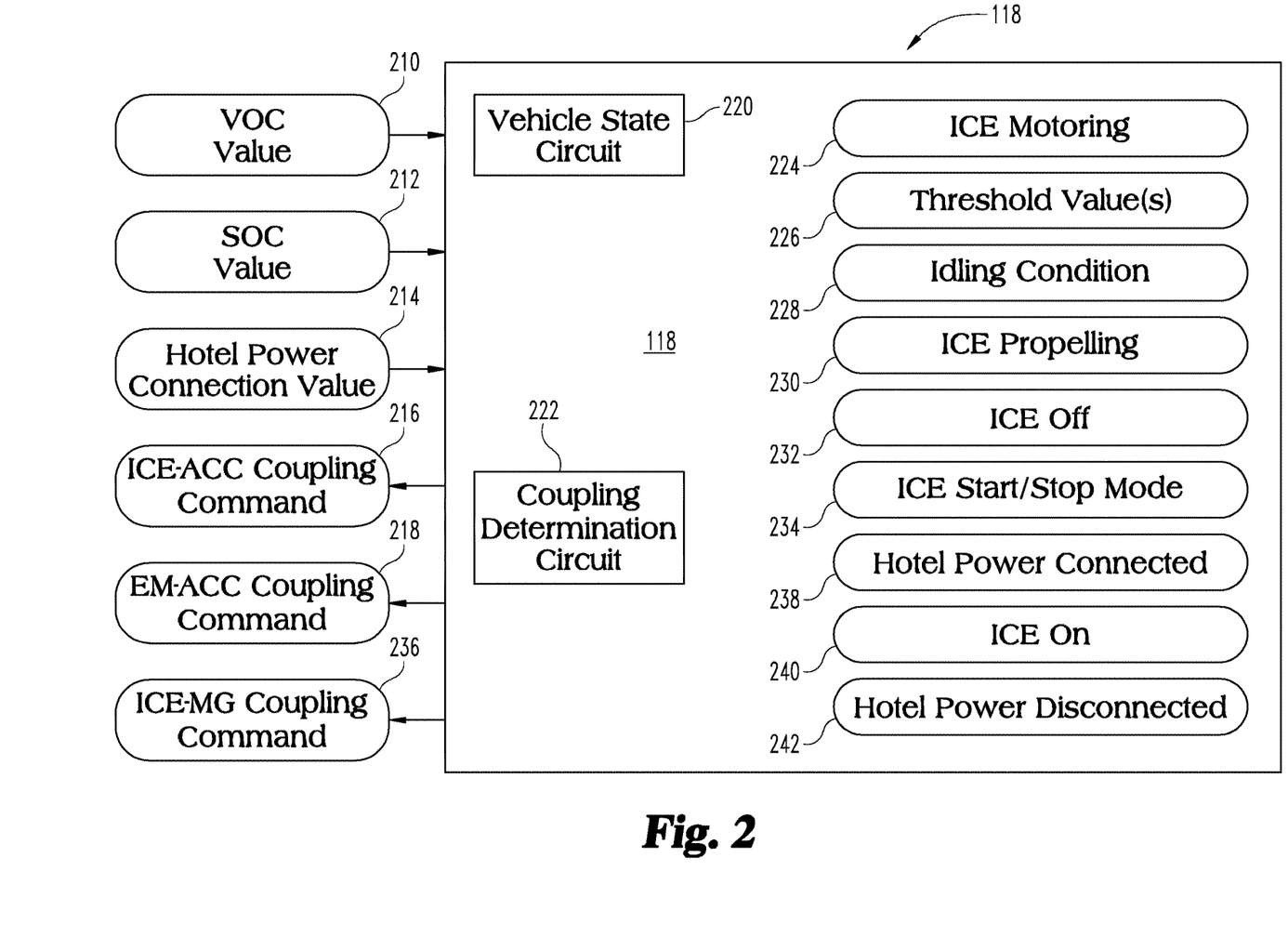
FIG. 2 is a schematic diagram of an example controller for a hybrid APU.

Referring to FIG. 1, an exemplary hybrid vehicle cabin climate control system 100 includes an internal combustion engine (ICE) 110, a controller 118, an electric machine such as a first motor generator 112 and/or a second motor generator 116, an air conditioning compressor (ACC) 114, and a battery 120. With further reference to FIG. 2, the system 100 operates by controlling the interactions of the system components depending on the vehicle operating conditions (VOC) value 210, the state of charge (SOC) value of a rechargeable battery 212, or if the vehicle is connected to shore power 122, providing hotel power connection value 214.

The example system 100 includes (ICE) 110 selectively coupled to first motor generator (MG1) 112 by a first clutch 12 and an air conditioning compressor (ACC) 114 selectively coupled to second motor generator (MG2) 116 by a second clutch 24. In certain embodiments, the system 100 includes a second MG2 116, and/or the ACC 114 selectively coupled to the second MG2 116 by a third clutch 46. Both MG1 and MG2 when selectively coupled to the ACC can be referred to as an electric machine (EM).

The term "selectively coupled," as used herein should be interpreted broadly. An example system 100 including selectively coupled components includes components that may be mechanically coupled (e.g., gearing, belt, or a clutch mechanism), electrically coupled (e.g., through the power down of a coil therein), and/or engaged from each other in any manner. Example systems 100 may include components which are selectively coupled, which are de-coupled, and/or which are not coupled. One of skill in the art contemplating a particular embodiment, having information ordinarily available regarding a system 100, and the benefit of the disclosure herein, can determine which components 112, 114, 116 are coupled, de-coupled, and/or selectively coupled for a particular system 100.

An example system 100 is disposed on a vehicle such that the system 100 remains in contact with the vehicle at relevant times and moves with the vehicle. An example system 100 further includes a rechargeable battery 120, which may be any type of battery contemplated in the art, and/or any type of electrical storage device (e.g. a hyper-capacitor or ultra-capacitor having sufficient storage capacity to perform the functions of the battery 120 described herein). Example systems 100 disposed on the vehicle include portions of the system 100 positioned within the engine compartment, positioned on a cab of a tractor-trailer or other vehicle, and/or positioned on or within a trailer of a tractor-trailer combination. The described locations of the system 100 in relation to the vehicle are non-limiting examples. A vehicle may include any type of vehicle with a climate-controlled enclosed cabin for the vehicle occupants, including without limitation, an on-road vehicle, an off-road vehicle, a tractor-trailer, a bobtail truck, a combined motive portion of the vehicle and a pup trailer, a railroad vehicle, a mining truck, a farm tractor, watercraft, and/or an oilfield vehicle.

An example system 100 further includes a controller 118 having a number of circuits that functionally execute operations of the controller 118. Referencing FIG. 2, an example controller 118 includes a vehicle state circuit 220 and a coupling determination circuit 222. Certain functional units described in this disclosure have been described as circuits, to more particularly emphasize the implementation independence of the circuit. A circuit may be any group of elements operationally coupled to perform the operations of the circuit, including at least: hardware; instructions stored on a computer readable medium which, when executed by a computer, cause the computer to perform one or more functions of the circuit; sensors, actuators; clutches; combinations of these; and/or any other device. An example circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Figure 3:
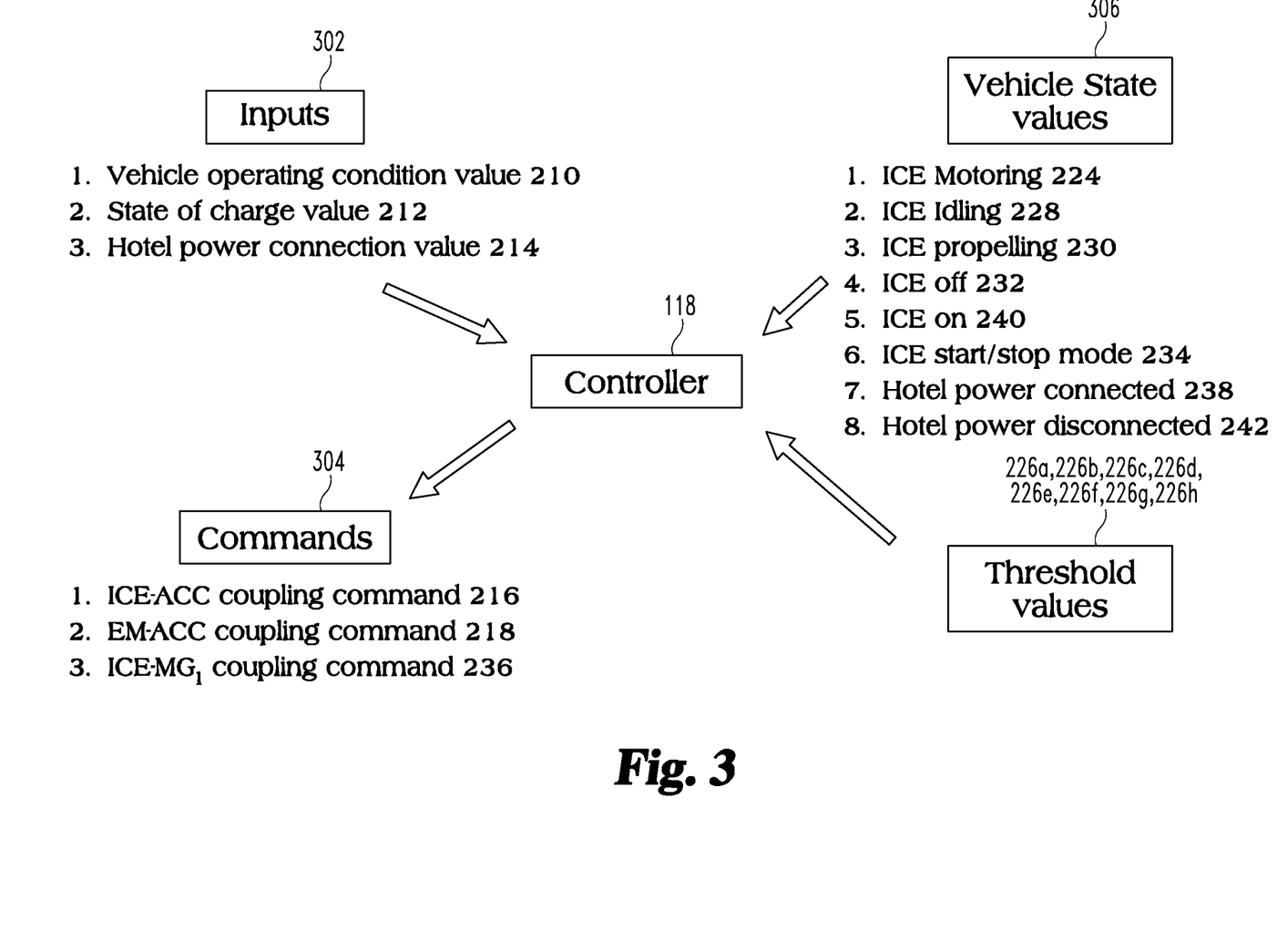
FIG. 3 is a block diagram of an example control system having a hybrid APU.

FIG. 3 is a block diagram illustrating the operation of controller 118. The controller 118 receives inputs 302 and vehicle state values 306 from the vehicle state circuit 220, and generates commands 304 via the coupling determination circuit 222 using one or more predetermined threshold values, which may be collectively and individually referred to as a threshold value(s) 226.

An example circuit may be at least partially implemented in machine-readable medium for execution by various types of processors. An identified circuit of executable code may, for instance, comprise one or more physical or logical blocks of computer instructions, which may, for instance, be organized as an object, procedure, or function. The executables of an identified circuit need not be physically located together, but may comprise disparate instructions stored in different locations which, when joined logically together, comprise at least a portion of the circuit and achieve at least a portion of the functions of the circuit. A circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. Examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The program code may also be stored in a computer readable medium that can direct a computer, other programmable data processing apparatus, or other devices to function in a particular manner, such that the instructions stored in the computer readable medium produce an article of manufacture including instructions which implement the function/act, or portions thereof, specified in the schematic flow descriptions herein and/or schematic block diagrams block or blocks.

The term "rechargeable battery," as used herein should be interpreted broadly. An example system 100 includes a rechargeable battery such as a nickel-metal hydride battery, a lithium ion battery, a nickel-cadmium battery, an ultra-capacitor, and/or a hyper capacitor. The size and type of rechargeable battery selected for a particular system 100 depends upon, without limitation, the discharge period contemplated for the application (e.g. the idle or non-moving time of the vehicle), the power output or throughput required to meet the needs of the contemplated system, the availability of regenerating events during use and/or offshore power for the application, the materials available for use in the application and/or the cost effectiveness of these, and/or the ambient temperature environment range contemplated for the system. One of skill in the art contemplating a particular embodiment, having information ordinarily available regarding a system 100, and the benefit of the disclosure herein, can determine which type(s) of rechargeable battery to utilize for a system 100.

The system 100 further includes a coupling determination circuit 222 structured to provide an ICE-ACC coupling command 216 as coupled in response to the Vehicle Operating Condition (VOC) value 210 indicating the ICE 110 is motoring and the State of Charge (SOC) value 212 is below a first threshold value 226a. The threshold value(s) 226 are depicted in the schematic diagram of FIG. 2 as being within a single data structure 226 for convenient illustration and description—however the threshold value(s) 226 may be present in any form for the system 100, including, without limitation, within separate data structures, and/or as a value emergent from hardware configurations or settings. The system 100 includes actuators responsive to the ICE-ACC coupling command 216 that couple the ICE 110 to the ACC 114. Coupled as used herein means the ICE 110 powers the ACC 114 and can include mechanically coupling (e.g., gearing, a clutch mechanism), electrically coupling (e.g., through the provision of current, or a lack of current, in a coil therein), and/or controllable engagement of the ACC 114 in any manner. The system 100 further includes a coupling determination circuit 222 structured to provide the ICE-ACC coupling command 216 as decoupled in response to the VOC value 210 indicating the ICE 110 is motoring and the SOC value 212 being below a second threshold value 226b. An example VOC value 210 is a vehicle speed below 5 miles per hour and an SOC value 212 of the battery charge of 20% or an engine speed greater than 100 rpm and the transmission engaged in a gear.

The example first threshold value 226a is an SOC value 212 below which the ICE 110 is coupled to the ACC 114 and could be set in a region where it is desired to have operation of the ACC 114 powered by the ICE 110 and/or regenerative braking is desirable simultaneously with operation of the ACC 114. An example region for the first threshold value 226a is between 10-30%. The second threshold value 226b sets a SOC value 212 below which the ICE 110 is decoupled from the ACC 114, and could be set in a region where it is desirable to reduce parasitic losses and/or operation of the ACC 114 is not needed. An example region for the second threshold value is between 30-100%. The provided examples for providing the first threshold value 226a and second threshold value 226b can depend on such things as total capacity of the battery, desired SOC limits for the battery, an amount of energy generally provided by regeneration events, an expected or estimated amount of energy to be provided by a particular regeneration event, and/or estimates of total electrical usage in the near term. The setting of the first and second threshold values 226a, 226b can be done in any manner according to the desired operation of the system 100 including the first threshold value 226a being higher or the second threshold value 226b being higher.

In certain embodiments, the first threshold value 226a and the second threshold value 226b are set at the same or substantially the same value—for example when additional criteria are utilized to determine whether the first threshold value 226a or the second threshold value 226b takes priority for determining the ICE 110-ACC 114 coupling decision. Example and non-limiting additional criteria include management of battery degradation and/or state-of-health (SOH), management of system cycling, current vehicle operation condition (e.g. moving or not moving), current state of power electronics efficiency of operation, and/or the likelihood of upcoming regeneration and/or system stop events. One of skill in the art contemplating a particular embodiment, having information ordinarily available regarding a system 100, and the benefit of the disclosure herein, can determine threshold values 226 for the first and second threshold value(s) 226a, 226b.

The system 100 further includes a coupling determination circuit 222 structured to provide an ICE-ACC coupling command 216 as coupled in response to the VOC value 210 indicating the ICE 110 is about to be started or is idling or is propelling the vehicle and the SOC value 212 is below a third threshold value 226c such as a SOC value 212 below 50%. The system 100 includes actuators responsive to the ICE-ACC coupling command 216 that couple the ICE 110 to the ACC 114. The system 100 further includes a coupling determination circuit 222 structured to provide the ICE-ACC coupling command 216 as decoupled in response to the VOC value 210 indicating the ICE 110 is idling or propelling the vehicle (i.e., the ICE 110 is running) and the SOC value 212 being below a fourth threshold value 226d. An example region for the fourth threshold value 226d is between 50-100%

The third threshold value 226c sets a SOC value 212 below which the ICE 110 is coupled to the ACC 114. An example third threshold value 226c is set where it is desirable for operation of the ACC 114 and/or the $MG_1$ 112 during a propelling of the vehicle such as a SOC value 212 between 0-50%. For example, in certain operating regions it may be desired that the ICE 110 rather than the battery 120 provide power for the ACC 114, may be desired that the battery 120 be charged during operations, and/or that the vehicle provide regenerative braking, such as through the ICE 110 to the $MG_1$ 112. The fourth threshold value 226d sets a SOC value 212 below which the ICE 110 is decoupled and could be set in a region where it is desirable to reduce parasitic losses and/or operation of the ACC 114 is not needed such as a SOC value 212 between 50-100%. The provided examples for providing the third threshold value 226c and fourth threshold value 226d can depend on such things as total capacity of the battery, amount of energy generally provided by the $MG_1$ 112, and/or estimates of total electrical usage in the near term. The setting of the third and fourth threshold values 226c, 226d can be done in any manner according to the desired operation of the system 100 including the third threshold value 226c being higher or the fourth threshold value 226d being higher.

In certain embodiments, for example where other criteria are utilized to determine which of the third and fourth threshold values 226c, 226d have priority, the third threshold value 226c and the fourth threshold value 226d may be set at the same value. Example considerations for setting the third and fourth threshold values 226c, 226d include a SOC and/or desired SOC range of the battery 120, vehicle speed, availability of a potential regenerative event and/or the amount of energy available in the potential regenerative event, the operations of the ACC 114, a reduction in system cycling (e.g. between engaged and disengaged states of the ICE 110-$MG_1$ 112/ACC 114), management of battery 120 degradation and/or SOH, availability of additional torque under the ICE 110 torque curve, current state of power electronics efficiency of operation, and/or the likelihood of upcoming regeneration and/or vehicle stop events. The ICE 110 being coupled to the ACC 114 may include the ICE 110 being coupled to the $MG_1$ 112 or not being coupled to the $MG_1$ 112 (e.g. with the $MG_1$ 112 having a de-energized coil, or a physical arrangement distinct from that depicted in the example of FIG. 1). One of skill in the art contemplating a particular embodiment, having information ordinarily available regarding a system 100, and the benefit of the disclosure herein, can determine threshold values 226 for the third and fourth threshold value(s) 226c, 226d.

The system 100 further includes a coupling determination circuit 222 structured to provide an ICE-ACC coupling command 216 as coupled in response to the VOC value 210 indicating the ICE 110 is idling and the SOC value 212 is below a fifth threshold value 226e. "Idling" should be interpreted broadly, and may include at least the ICE 110 operating but the vehicle not moving, the ICE 110 operating at a lowest speed value, the ICE 110 operating at a speed value below a threshold value (e.g. 600 RPM, 700 RPM, 1000 RPM, or other value), and/or the ICE 110 operating at a torque value below a threshold torque value (e.g. 10% of rated torque, 20% of rated torque, a torque below 100 ft-lbs., a torque value where the ICE 110 is powering only the rotation of the engine and/or parasitic losses, or other value). The system 100 includes actuators responsive to the ICE-ACC coupling command 216 that couple the ICE 110 to the ACC 114. Coupled as used herein means the ICE 110 powers the ACC 114 and can include mechanically coupling (e.g., gearing, a clutch mechanism), electrically coupling (e.g., through the power down of a coil therein), and/or powered engagement of the ACC 114 in any manner. The system 100 further includes a coupling determination circuit 222 structured to provide the ICE-ACC coupling command 216 as decoupled in response to the VOC value 210 indicating the ICE 110 is idling and the SOC value 212 being below a sixth threshold value 226f such as a SOC value 212 between 50-100%.

The fifth threshold value 226e sets a SOC value 212 below which the ICE 110 is coupled to the ACC 114 and could be set in a region where operation of the ACC 114 and/or operation of the $MG_1$ 112 is desirable with operation of the ACC 114 such as a SOC value 212 below 50%. The sixth threshold value 226f sets a SOC value 212 below which the ICE 110 is decoupled and could be set in a region where it is desirable to reduce parasitic losses and/or operation of the ACC 114 is not needed such as a SOC value 212 between 50-100%. The provided examples for providing the fifth threshold value 226e and sixth threshold value 226f can depend on such things as total capacity of the battery, amount of energy generally provided by the $MG_1$ 112, and/or estimates of total electrical usage in the near term. The setting of the fifth and sixth threshold values 226e, 226f can be done in any manner according to the desired operation of the system 100 including the fifth threshold value 226e being higher or the sixth threshold value 226f being higher.

In certain embodiments, for example where other criteria are utilized to determine whether the fifth or sixth threshold values 226e, 226f have priority, the fifth threshold value 226*e* and the sixth threshold value 226*f* may be set at the same value. Example considerations for setting the fifth and sixth threshold values 226*e*, 226*f* include a SOC and/or desired SOC range of the battery 120, an amount of time the ICE 110 has been in an idling condition, the operations of the ACC 114, a reduction in system cycling (e.g. between engaged and disengaged states of the ICE 110-$MG_1$ 112/ACC 114), management of battery 120 degradation and/or SOH, an estimated time until the vehicle moves and/or until the ICE 110 is expected to leave the idling condition, and/or current state of power electronics efficiency of operation. One of skill in the art contemplating a particular embodiment, having information ordinarily available regarding a system 100, and the benefit of the disclosure herein, can determine threshold values 226 for the fifth and sixth threshold value(s) 226*e*, 226*f*.

The system 100 further includes a coupling determination circuit 222 structured to provide an ICE-$MG_1$ coupling command 236 as coupled in response to the VOC value 210 indicating the ICE 110 is motoring 224 and the SOC value 212 is below a seventh threshold value 226*g*. The system 100 includes actuators responsive to the ICE-$MG_1$ coupling command 236 that couple the ICE 110 to the $MG_1$ 112. Coupled as used herein means the ICE 110 powers the $MG_1$ 112 and can include mechanically coupling (e.g., gearing, a clutch mechanism), electrically coupling (e.g., through the provision of current, or a lack of current, in a coil therein), and/or controlled engagement of the $MG_1$ 112 in any manner. The system 100 further includes a coupling determination circuit 222 structured to provide the ICE-$MG_1$ coupling command 236 as decoupled in response to the VOC value 210 indicating the ICE 110 is motoring 224 and the SOC value 212 being below a eighth threshold value 226*h*. The seventh threshold value 226*g* sets a SOC value 212 below which the ICE 110 is coupled to the $MG_1$ 112 and could be set in a region where for operation of the $MG_1$ 112 and/or regenerative braking is desirable with operation of the $MG_1$ 112 such as a SOC value 212 below 50%. The eighth threshold value 226*h* sets a SOC value 212 below which the ICE 110 is decoupled and could be set in a region where it is desirable to reduce parasitic losses and/or operation of the $MG_1$ 112 is not needed such as a SOC value 212 between 50-100%. The provided examples for providing the seventh threshold value 226*g* and eighth threshold value 226*h* can depend on such things as total capacity of the battery, amount of energy generally provided by regeneration events, and/or estimates of total electrical usage in the near term. The setting of the seventh and eighth threshold values 226*g*, 226*h* can be done in any manner according to the desired operation of the system 100 including the seventh threshold value 226*g* being higher or the eighth threshold value 226*h* being higher.

In certain embodiments, for example where other criteria are utilized to determine whether the seventh or eighth threshold values 226*g*, 226*h* have priority, the seventh and eighth threshold values 226*g*, 226*h* may be set to the same value. Example considerations for setting the seventh and eighth threshold values 226*g*, 226*h* include a SOC and/or desired SOC range of the battery 120, an amount of time the ICE 110 has been in a motoring condition, the operations of the ACC 114, a reduction in system cycling (e.g. between engaged and disengaged states of the ICE 110-$MG_1$ 112/ACC 114), management of battery 120 degradation and/or SOH, an estimated time until the vehicle stops or moves and/or until the ICE 110 is expected to leave the motoring condition, and/or current state of power electronics efficiency of operation. One of skill in the art contemplating a particular embodiment, having information ordinarily available regarding a system 100, and the benefit of the disclosure herein, can determine threshold values 226 for the seventh and eighth threshold value(s) 226*g*, 226*h*.

The system 100 further includes a coupling determination circuit 222 structured to provide an ICE-$MG_1$ coupling command 236 as coupled in response to the VOC value 210 indicating the ICE 110 is propelling the vehicle 230 and the SOC value 212 is below a ninth threshold value 226*i*. The system 100 includes actuators responsive to the ICE-$MG_1$ coupling command 236 that couple the ICE 110 to the $MG_1$ 112. Coupled as used herein means the ICE 110 powers the $MG_1$ 112 and can include mechanically coupling (e.g., gearing, a clutch mechanism), electrically coupling (e.g., through the provision of current, or a lack of current, in a coil therein), and/or controlled engagement of the $MG_1$ 112 in any manner. The system 100 further includes a coupling determination circuit 222 structured to provide the ICE-$MG_1$ coupling command 236 as decoupled in response to the VOC value 210 indicating the ICE 110 is propelling the vehicle 230 and the SOC value 212 being below a tenth threshold value 226*j*. The ninth threshold value 226*i* sets a SOC value 212 below which the ICE 110 is coupled to the $MG_1$ 112 and could be set in a region where operation of the $MG_1$ 112 and/or operation of the ACC 114 is desirable such as a SOC value 212 below 50%. The tenth threshold value 226*j* sets a SOC value 212 below which the ICE 110 is decoupled and could be set in a region where it is desirable to reduce parasitic losses and/or operation of the $MG_1$ 112 is not needed such as a SOC value 212 between 50-100%. The provided examples for providing the ninth threshold value 226*i* and tenth threshold value 226*j* can depend on such things as total capacity of the battery, amount of energy generally provided by regeneration events, and/or estimates of total electrical usage in the near term. The setting of the ninth and tenth threshold values 226*i*, 226*j* can be done in any manner according to the desired operation of the system 100 including the ninth threshold value 226*i* being higher or the tenth threshold value 226*j* being higher.

In certain embodiments, for example where other criteria are utilized to determine whether the ninth or tenth threshold values 226*i*, 226*j* have priority, the ninth threshold value 226*i* and the tenth threshold value 226*j* may be set to the same value. Example considerations for setting the ninth and tenth threshold values 226*i*, 226*j* include a SOC and/or desired SOC range of the battery 120, vehicle speed, availability of a potential regenerative event and/or the amount of energy available in the potential regenerative event, the operations of the ACC 114, a reduction in system cycling (e.g. between engaged and disengaged states of the ICE 110-$MG_1$ 112), management of battery 120 degradation and/or SOH, predicted response time of the ICE 110 to a potential torque request, current state of power electronics efficiency of operation, and/or the likelihood of upcoming regeneration and/or vehicle stop events. One of skill in the art contemplating a particular embodiment, having information ordinarily available regarding a system 100, and the benefit of the disclosure herein, can determine threshold values 226 for the ninth and tenth threshold value(s) 226*i*, 226*j*.

The system 100 further includes a coupling determination circuit 222 structured to provide an ICE-$MG_1$ coupling command 236 as coupled in response to the VOC value 210 indicating the ICE 110 is idling 228 and the SOC value 212 is below a eleventh threshold value 226*k*. The system 100 includes actuators responsive to the ICE-$MG_1$ coupling command 236 that couple the ICE 110 to the $MG_1$ 112.

Coupled as used herein means the ICE 110 powers the MG$_1$ 112 and can include mechanically coupling (e.g., gearing, a clutch mechanism), electrically coupling (e.g., through the provision of current, or a lack of current, in a coil therein), and/or controlled engagement of the MG$_1$ 112 in any manner. The system 100 further includes a coupling determination circuit 222 structured to provide the ICE-MG$_1$ coupling command 236 as decoupled in response to the VOC value 210 indicating the ICE 110 is idling 228 and the SOC value 212 being below a twelfth threshold value 226l.

The eleventh threshold value 226k sets a SOC value 212 below which the ICE 110 is coupled to the MG$_1$ 112 and could be set in a region operation of the MG$_1$ 112 is desired such as a SOC value 212 below 50%. The twelfth threshold value 226l sets a SOC value 212 below which the ICE 110 is decoupled and could be set in a region where it is desirable to reduce parasitic losses and/or operation of the MG$_1$ 112 is not needed such as a SOC value 212 between 50-100%. The provided examples for providing the eleventh threshold value 226k and twelfth threshold value 226l can depend on such things as total capacity of the battery, amount of energy generally provided by the MG$_1$ 112, and/or estimates of total electrical usage in the near term. The setting of the eleventh and twelfth threshold values 226k, 226l can be done in any manner according to the desired operation of the system 100 including the eleventh threshold value 226k being higher or the twelfth threshold value 226l being higher.

In certain embodiments, for example where other criteria are utilized to determine whether the eleventh or twelfth threshold values 226k, 226l have priority, the eleventh threshold value 226k and the twelfth threshold value 226l may be set to the same value. Example considerations for setting the eleventh and twelfth threshold values 226k, 226l include a SOC and/or desired SOC range of the battery 120, an amount of time the ICE 110 has been in an idling condition, the operations of the ACC 114, a reduction in system cycling (e.g. between engaged and disengaged states of the ICE 110-MG$_1$ 112), management of battery 120 degradation and/or SOH, an estimated time until the vehicle moves and/or until the ICE 110 is expected to leave the idling condition, and/or current state of power electronics efficiency of operation. One of skill in the art contemplating a particular embodiment, having information ordinarily available regarding a system 100, and the benefit of the disclosure herein, can determine threshold values 226 for the eleventh and twelfth threshold value(s) 226k, 226l.

An example system 100 further includes a controller 118 with a vehicle state circuit 220 structured to determine a vehicle operating condition (VOC) value 210; and a coupling determination circuit 222 structured to provide an ICE-MG$_1$ coupling command 236 as coupled and an ACC-EM coupling command 218 as decoupled in response to VOC value 210 indicating the ICE is off ("ICE Off 232"). In one example, the ICE-MG$_1$ coupling command 236 being coupled and the ACC-EM coupling command 218 being decoupled positions the system 100 in a condition where rapid re-start of the ICE 110 is available if desired.

An example system 100 includes the vehicle state circuit 220 structured to determine a state-of-charge (SOC) value 212, and the coupling determination circuit 222 structured to provide the ICE-MG$_1$ coupling command 236 and the ACC-EM coupling command 218 in response to the SOC value 212. The example system 100 includes the coupling determination circuit 222 is further structured to provide the ICE-MG$_1$ coupling command 236 as coupled and the ACC-EM coupling command 218 as decoupled further in response to the VOC value 210 indicating that the ICE is in a start/stop mode 234. In one example, the ICE-MG$_1$ coupling command 236 being coupled and the ACC-EM coupling command 218 being decoupled positions the system 100 in a condition where rapid re-start of the ICE 110 is available when the ICE is in a start/stop mode 234.

An example system 100 also includes a controller 118 with a vehicle state circuit 220 structured to determine a hotel power connection value 214; and a coupling determination circuit 222 structured to provide an ICE-MG$_1$ coupling command 236 as decoupled and an ACC-EM coupling command 218 as coupled in response to the hotel power connection value 214 indicating that hotel power is connected 238. The example system 100 provides for powering the MG$_1$ 112 and/or charging the battery 120 with hoteling (e.g. "offshore") power when such power is available, without turning over or otherwise disturbing the ICE 110.

An example system 100 further includes the rechargeable battery 120, an internal combustion engine (ICE) 110 selectively coupled to an MG$_1$ 112, an air conditioning compressor (ACC) 114 coupled to an electric machine (EM) (e.g. MG$_2$ 116), a controller 118 having a vehicle state circuit 220 structured to determine at least one of a vehicle operating condition (VOC) value 210, a state-of-charge (SOC) value 212, and a hotel power connection value 214. The system 100 further includes a coupling determination circuit 222 that provides: an ACC-EM coupling command 218 as coupled in response to the SOC value 212 being greater than a thirteenth threshold value 226m (e.g. powering the ACC 114 with at least one of the MGs 112, 116 when battery 120 power is sufficient); an ACC-EM coupling command 218 as coupled in response to the VOC value 210 indicating the ICE 110 is on ("ICE On 240") (e.g. to enable charging the battery 120 when the ICE 110 is on, and/or to improve a response time of the system 100); an ACC-EM coupling command 218 as coupled in response to the hotel power connection value 214 indicating that hotel power is connected 238; an ACC-EM coupling command 218 as decoupled in response to the SOC value 212 being less than a fourteenth threshold value 226n (e.g. to avoid draining the battery 120 or to maintain the battery 120 within a selected SOC range); an ACC-EM coupling command 218 as decoupled in response to the VOC value 210 indicating ICE Off 232; and an ACC-EM coupling command 218 as decoupled in response to the hotel power connection value 214 indicating that hotel power is disconnected 242. An example system 100 further includes an MG$_2$ 116 including an electric motor and/or power electronics, where the MG$_2$ 116 is electrically coupled to the rechargeable battery 120. An example region for the thirteenth threshold value 226m for the SOC value 212 is greater than 20%. An example region for the fourteenth threshold value 226n for the SOC value 212 is greater than 10%.

It should be understood that no claim element herein is to be construed under the provisions of 35 U.S.C. §112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
   an internal combustion engine, an air conditioning compressor, and a first motor generator of a vehicle, the internal combustion engine being mechanically selectively coupled with the first motor generator by a first clutch mechanism, the first motor generator being mechanically selectively coupled with the air conditioning compressor by a second clutch mechanism;
   a rechargeable battery coupled to the first motor generator; and
   a controller comprising a vehicle state circuit structured to determine a vehicle operating condition value and a state-of-charge value of the rechargeable battery and a coupling determination circuit structured to provide an internal combustion engine-first motor generator coupling command in response to the vehicle operating condition value and the state-of-charge value;
   wherein the internal combustion engine is operable to propel the vehicle and the internal combustion engine is operable to selectively power the first motor generator;
   wherein in a first operation the first clutch is engaged, the first motor generator is powered by the internal combustion engine to recharge the rechargeable battery and the second clutch is disengaged and the air conditioning compressor is not powered by the first motor generator, and wherein in a second operation the second clutch is engaged and the air conditioning compressor is powered by the first motor generator and the first clutch is disengaged and the first motor generator is not powered by the internal combustion engine:
   wherein the coupling determination circuit is structured to:
   prioritize one of a first threshold value for evaluating the state of change value and a second threshold value for evaluating the state of charge value,
   provide the internal combustion engine-first motor generator coupling command as coupled in response to operation in response to the first threshold value being prioritized, the vehicle operating condition value indicating the internal combustion engine is motoring, and the state-of-charge value being below the first threshold value, and
   provide the internal combustion engine-first motor generator coupling command as decoupled in response to the second threshold value being prioritized, the vehicle operating condition value indicating the internal combustion engine is motoring, and the state-of-charge value being below the second threshold value; and
   wherein, in response to the internal combustion engine-first motor generator coupling command being provided as coupled, the internal combustion engine powers the first motor generator and in response to the internal combustion engine-first motor generator coupling command being provided as decoupled, the internal combustion engine does not power the first motor generator.

2. The system of claim 1, wherein:
   the internal combustion engine, the air conditioning compressor, and the first motor generator are disposed on the vehicle.

3. The system of claim 1, wherein:
   the coupling determination circuit is structured to provide the internal combustion engine-first motor generator coupling command as coupled in response to the vehicle operating condition value indicating the internal combustion engine is propelling the vehicle and the state-of-charge value being below a first propelling threshold value.

4. The system of claim 1, wherein:
   the coupling determination circuit is structured to provide the internal combustion engine-first motor generator coupling command as decoupled in response to the vehicle operating condition value indicating the internal combustion engine is propelling the vehicle and the state-of-charge value being below a second propelling threshold value greater than a first propelling threshold value.

5. The system of claim 1, wherein:
   the coupling determination circuit is structured to provide the internal combustion engine-first motor generator coupling command as coupled in response to the vehicle operating condition value indicating the internal combustion engine is idling and the state-of-charge value being below a first idling threshold value.

6. The system of claim 5, wherein
   the coupling determination circuit is structured to provide the internal combustion engine-first motor generator coupling command as decoupled in response to the vehicle operating condition value indicating the internal combustion engine is idling and the state-of-charge value being below a second idling threshold value that is greater than the first idling threshold value.

7. The system of claim 1,
   wherein the coupling determination circuit structured to provide the internal combustion engine-first motor generator coupling command as coupled, and an air conditioning compressor-first motor generator coupling command as decoupled, in response to the vehicle operating condition value indicating the internal combustion engine is off.

8. The system of claim 7, wherein:
the vehicle state circuit is structured to determine a state-of-charge value of the rechargeable battery; and
the coupling determination circuit is structured to provide the internal combustion engine-first motor generator coupling command and the air conditioning compressor-first motor generator coupling command further in response to the state-of-charge value.

9. The system of claim 1,
wherein the coupling determination circuit structured to provide an internal combustion engine-first motor generator coupling command as decoupled and an air conditioning compressor-first motor generator coupling command as coupled in response to the hotel power connection value indicating that hotel power is connected,
wherein, in response to the air conditioning compressor-first motor generator coupling command being provided as coupled, the first motor generator powers the air conditioning compressor via the hotel power connection.

10. The system of claim 1, wherein the coupling determination circuit is structured to prioritize operation in response to one of the first threshold value and the second threshold value using additional criteria, the additional criteria comprising one or more of a battery degradation criterion, a battery state-of-health (SOH) criterion, a system cycling criterion, a current vehicle operation condition criterion, a current state of power electronics efficiency criterion, and a likelihood of upcoming regeneration criterion, and a likelihood of upcoming system stop events criterion.

11. The system of claim 1, wherein the first clutch and the second clutch can be engaged so that the air conditioning compressor is powered by the internal combustion engine without using power from the rechargeable battery.

12. A vehicle system comprising:
a first motor generator;
an internal combustion engine operable to propel the vehicle and to selectively power the first motor generator;
an air conditioning compressor;
a first actuator configured to couple the internal combustion engine and the first motor generator in response to a coupling command and to decouple the internal combustion engine and the first motor generator in response to a decoupling command;
a rechargeable battery coupled to the first motor generator; and
a controller configured to perform the acts of:
determining a vehicle operating condition value,
determining a state-of-charge value of the rechargeable battery,
prioritizing use of one of a first threshold value and a second threshold value for evaluation of the state-of-charge value,
providing the coupling command if the vehicle operating condition value indicates that the internal combustion engine is motoring, the first threshold value is prioritized, and the state-of-charge value is below the first threshold value, the internal combustion engine powering the first motor generator in response to the coupling command being provided, and
providing the decoupling command if the vehicle operating condition value indicates that the internal combustion engine is motoring, the second threshold value is prioritized, and the state-of-charge value is below the second threshold value, the internal combustion engine not powering the first motor generator in response to the decoupling command being provided.

13. The vehicle system of claim 12, wherein the controller is configured to perform the acts of:
providing the coupling command if the vehicle operating condition value indicates that the internal combustion engine is propelling the vehicle and the state-of-charge value is below a first propelling threshold value, and
providing the decoupling command if the vehicle operating condition value indicates that the internal combustion engine is propelling the vehicle and the state-of-charge value is below a second propelling threshold value greater than the first propelling threshold value.

14. The vehicle system of claim 12, wherein the controller is configured to perform the acts of:
providing the coupling command if the vehicle operating condition value indicates that the internal combustion engine is idling and the state-of-charge value being below a first idling threshold value, and
providing the decoupling command if the vehicle operating condition value indicates that the internal combustion engine is idling and the state-of-charge value being below a second idling threshold value that is greater than the first idling threshold value.

15. A method comprising:
operating a vehicle system including a first motor generator, an internal combustion engine operable to propel the vehicle and to selectively power the first motor generator, an air conditioning compressor, a first actuator configured to couple the internal combustion engine and the first motor generator in response to a coupling command and to decouple the internal combustion engine and the first motor generator in response to a decoupling command, a rechargeable battery coupled to the first motor generator, and a controller configured; and
operating the controller to perform the acts of:
determining a vehicle operating condition value,
determining a state-of-charge value of the rechargeable battery,
prioritizing use of one of a first threshold value and a second threshold value for evaluation of the state-of-charge value,
providing the coupling command in response to the vehicle operating condition value indicating that the internal combustion engine is motoring, the first threshold value is prioritized, and the state-of-charge value is below the first threshold value, the internal combustion engine powering the first motor generator in response to the coupling command being provided, and
providing the decoupling command in response to the vehicle operating condition value indicating that the internal combustion engine is motoring, the second threshold value is prioritized, and the state-of-charge value is below the second threshold value, the internal combustion engine not powering the first motor generator in response to the decoupling command being provided.

16. The method of claim 15, comprising operating the controller to perform the acts of:
providing the coupling command in response to the vehicle operating condition value indicating that the internal combustion engine is propelling the vehicle and the state-of-charge value is below a first propelling threshold value, and providing the decoupling command in response to the vehicle operating condition value indicating that the internal combustion engine is propelling the vehicle and the state-of-charge value is below a second propelling threshold value greater than the first propelling threshold value.

17. The method of claim 15, comprising operating the controller to perform the acts of:
providing the coupling command in response to the vehicle operating condition value indicating that the internal combustion engine is idling and the state-of-charge value being below a first idling threshold value, and
providing the decoupling command in response to the vehicle operating condition value indicating that the internal combustion engine is idling and the state-of-charge value being below a second idling threshold value that is greater than the first idling threshold value.

* * * * *